March 9, 1965 J. W. SCOTT, JR 3,172,835
CATALYTIC HYDROCRACKING PROCESS WITH
RECYCLING OF HYDROGENATED FRACTION
Filed Jan. 3, 1963 2 Sheets-Sheet 1

INVENTOR
JOHN W. SCOTT, JR.
BY Roy K. Davies
ATTORNEY

United States Patent Office 3,172,835
Patented Mar. 9, 1965

3,172,835
CATALYTIC HYDROCRACKING PROCESS WITH RECYCLING OF HYDROGENATED FRACTION
John W. Scott, Jr., Ross, Calif., assignor to California Research Corporation, San Francisco, Calif., a corporation of Delaware
Filed Jan. 3, 1963, Ser. No. 249,221
2 Claims. (Cl. 208—58)

*Introduction*

This invention relates to a hydrocarbon conversion process, and, more particularly, to a hydrocracking process for the catalytic conversion of petroleum distillates to produce valuable hydrocarbon products including naphthas and middle distillates, with reduced catalyst fouling to permit longer on-stream periods before the catalyst temperature necessary to maintain reasonable conversion levels reaches an intolerably high value.

*Prior art*

It has been well known heretofore that, although catalytic hydrocracking is recognized as one of the most useful processes available to modern refiners, at least two main counteracting influences have been at work to reduce the economic attractiveness of this type of hydrocracking. These influences, which are interrelated, are: (1) the inability of most modern hydrocracking processes to be operated for sustained on-stream periods under reasonable conditions without the onset of intolerable catalyst fouling rates, and (2) the inability of most modern catalytic hydrocracking catalysts to be satisfactorily regenerated.

It is well known that the current costs of hydrocracking catalysts are extremely high and that these costs form a substantial portion not only of the original plant investment, but of the amounts necessary to maintain the plant in operation when it is necessary to replace with expensive fresh catalyst from time to time used catalyst that is not satisfactorily regenerable.

While many literature references exist that purport to disclose various methods for regenerating hydrocracking catalysts, it is significant to not that nearly any hydrocracking catalyst can be partially regenerated by almost any type of regeneration, but that such partial regeneration is frequently a means for restoring only a portion of the catalytic activity that has been lost. For example, if a catalyst has been reduced in activity from 100% to 25%, regeneration that purports to double the activity of the spent catalyst in reality merely produces a catalyst having only 50% of the fresh catalyst activity.

*Objects*

From the foregoing, it is clear that methods for enabling hydrocracking processes to be operated for sustained on-stream periods under reasonable conditions without the onset of intolerable catalyst fouling rates are at least equally important with methods for satisfactorily regenerating hydrocracking catalysts. Accordingly, it is a primary object of the present invention to provide methods for operating a hydrocracking process for extended on-stream periods under reasonable operating conditions without intolerable increases in catalyst fouling rates.

*Drawings*

This invention will be more clearly understood, and further objects and advantages thereof will be apparent, from the following description when read in connection with the accompanying drawings, in which.

*The present invention*

Figure 1:
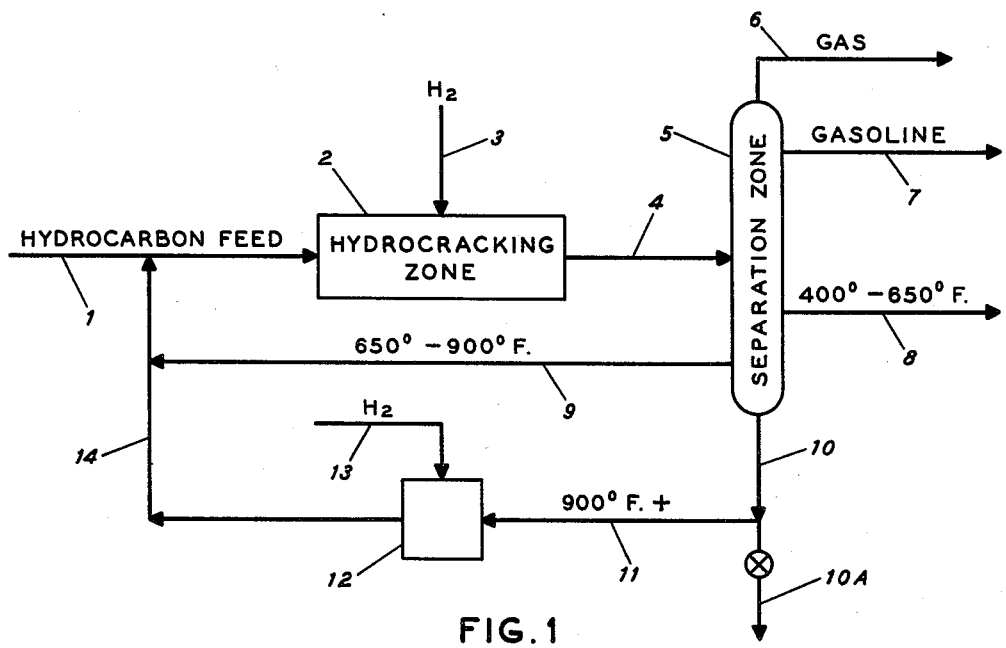
FIG. 1 is a diagrammatic illustration of an embodiment of process units and flow path suitable for carrying out the process of the present invention.

It has been discovered that in hydrocracking processes employing hydrocarbon feeds containing materials boiling above about 900° F. and employing a liquid recycle operation in which from 5 to 100 volume percent of the materials in the hydrocracking zone effluent boiling above about 900° F. are returned to the hydrocracking zone for further processing there is an unexpected deleterious effect of the use of the recycle method of operation. If has been found that in this type of operation, there is a build up in the system of certain refractory compounds that exert a particularly deleterious effect on catalyst activity and that are highly resistant to destruction by carcking.

It is not a present purpose to explain in detail the various theories as to the exact nature of the refractory compounds causing a deleterious effect, or exactly how they interact with the hydrocracking catalyst to cause trouble. It will suffice for present purposes to point out that apparently these refractory compounds are high molecular weight, condensed ring, polynuclear aromatic hydrocarbon structures that foul the hydrocracking catalyst at an intolerable rate, and that, because these structures are extremely refractory to cracking, their influence on the catalyst fouling rate becomes progressively greater as they build up in the recycle system.

The means provided herewith to combat the build up of the aforesaid refractory compounds are set forth and exemplified in more detail below. Generally speaking, however, it may be said that it has been discovered that the aforesaid refractory compounds, while extremely resistant to cracking, are much less resistant to hydrogenation, and that, following hydrogenation, they no longer build up in the recycle stream and no longer exert their former adverse influence on catalyst fouling rate. It is not a present purpose to set forth a detailed theory of exactly why hydrogenation works the advantageous results; regardless of whether hydrogenation prevents the compounds from laying down on the catalyst, or whether it renders them amenable to cracking so that the extent of their build-up in the recycle system is minimized, they are effectively counteracted by the process of the present invention. It also is not present purpose to explain in detail the source of the heavy refractory polynuclear aromatics; it is most probably that they enter the system in the feed, however, it is at least a possibility that, at least to some extent, they may be created in the hydrocracking zone and/or in any preceding hydrofining step.

In accordance with the present invention, there is provided a method of producing hydrocarbon fuels which comprises contacting a hydrocarbon feed selected from the group consisting of hydrocarbon distillates and hydrocarbon residua boiling above about 350° F. and containing materials boiling above about 900° F. in a hydrocracking zone in the presence of at least 1000 s.c.f. of hydrogen per barrel of said feed with a catalyst comprising a hydrogenating-dehydrogenating component disposed on a support at a temperature of about from 400° to 900° F., a pressure of at least 500 p.s.i.g. and an LHSV of about from 0.1 to 15, withdrawing from said zone at least one normally gaseous fraction, at least one liquid product fraction, and at least one recycle fraction containing materials boiling above about 900° F., hydrogenating at least 5 volume percent of said materials boiling above about 900° F. in said recycle fraction, and returning said recycle fraction to said hydrocracking zone.

Significant process improvements are obtained by the aforesaid operation wherein at least 5 volume percent of all materials boiling above about 900° F. that are recycled to the hydrocracking zone are first hydrogenated before being recycled. Preferably, at least 50 volume percent, and still more preferably substantially all, of said materials boiling above 900° F. that are recycled are hydrogenated prior to being recycled. More particularly, it is most desirable to sufficiently hydrogenate all recycled materials boiling above about 900° F. that the polynuclear aromatics content in said recycled materials are hydrogenated at least down substantially to structures having not more than one aromatic ring in the condensed ring structure, to an extent that the compounds remaining therein that have at least two fused aromatic rings are reduced down to at least 5 volume percent of said materials boiling above about 900° F.

Neither the number of streams recycled to the hydrocracking zone nor the boiling range of said streams is critical to the process of the present invention, provided that the total amount of recycled materials includes materials boiling above about 900° F. and provided that, regardless of which recycle stream or streams is hydrogenated, as a result of the hydrogenation, at least 5 volume percent of all recycled materials boiling above 900° F. is hydrogenated. An obvious way to accomplish this result would be to separate from the effluent from the hydrocracking zone a bottoms fraction containing only materials boiling above about 900° F. and to hydrogenate to the necessary extent any portion of this bottoms stream that is recycled. However, such a separation generally is extremely difficult to make in practice; accordingly, it is desirable to separate a bottoms fraction which contains materials boiling below 900° F., for example a bottoms fraction boiling above about 600° F., and to sufficiently hydrogenate the portions of this bottoms fraction to a sufficient degree to accomplish hydrogenation of at least 5 volume percent of all recycled materials boiling above about 900° F.

The process of the present invention provides a method of achieving production of the desired products with substantially complete extinction recycle of other non-gaseous materials from the hydrocracking zone. I.e., a substantially complete conversion (conversions of from about 95 to 100%) of the feed to the desired products may be obtained. In addition to the high conversions, long runs exceeding 500 hours between regenerations or catalyst replacements may be obtained.

The hydrogenation step of the process is conducted at a temperature which is preferably at least 100° F. below the highest temperature employed in said hydrocracking zone.

Those skilled in the art will recognize that, since the deleterious high molecular weight polynuclear aromatics in the liquid recycle stream generally will be concentrated in the bottoms stream from the hydrocracking zone, their build-up could be substantially reduced by the simple expedient of withdrawing a percentage of the bottoms stream from the system. However, this would entail a continuous reduction in conversions and yields, based on fresh feed, would require special processing facilities for removing and disposing of the rejected portion of the bottoms stream, and would increase the per-unit cost of the hydrocracking products.

While any conventional hydrogenation facilities may be used for hydrogenation of the hydrocracking recycle bottoms stream in accordance with the present invention, it has been found unexpectedly desirable to utilize a hydrogenation reactor located in the high pressure hydrogen system associated wtih the hydrocracking zone. The reactor may be located in any portion of this system, for example in the recycle hydrogen stream and/or in the fresh hydrogen make-up stream. Because the hydrocracking zone is operated at pressures of at least 500 p.s.i.g., and generally higher, the reactor may be installed in the existing high pressure hydrogenation facilities for the hydrocracking zone at low incremental cost, and, because of its operating pressure, can be of relatively small size.

It is advantageous in operating the process of the present invention to return to the hydrocracking zone a hydrogen-rich recycle stream obtained from the effluent from said zone, along with the make-up hydrogen necessary to replace that consumed in the process, which operates with a net consumption of hydrogen.

Feed

The feed stocks employed in the process of the present invention boil above about 350° F. and preferably boil over a range of at least 50° F.; suitable feed stocks include those heavy distillates normally defined as heavy straight run gas oils and heavy cracked cycle oils, as well as conventional FCC feeds and portions thereof, as well as fractions from extraction processes. Cracked stocks may be obtained either from thermal or catalytic cracking of various stocks, including those obtained from petroleum, gilsonite, shale and coal tar. Residual feeds may include Minas residua and other paraffinic-type residua, as well as residual fractions prepared by separation processes such as deasphalting, solvent decarbonizing, and the like.

When jet fuel products are desired, the most preferred feeds to the present process are those having an initial boiling point of at least 500° F., particularly when the feeds are to be hydrocracked in the presence of non-acidic or only weakly acidic catalyst. With such feeds, the jet fuel products tend to have more superior properties, in that they are more naphthenic, less aromatic (therefore having higher smoke points), and lower in normal paraffins (therefore having lower freeze points), than products from feeds having a lower initial boiling point. The product in the jet fuel boiling range is generally more satisfactory for jet fuel purposes when the initial boiling point of the feed is at least 500° F. than when it is lower.

When middle distillate products other than jet fuels are required, the most preferred feeds to the present process are those having an initial boiling point of at least 650° F.

Operating conditions in hydrocracking zone

The hydrocarbon feed and hydrogen are contacted in the hydrocracking zone at pressures of at least 500 p.s.i.g., preferably from about 800 to 3000 p.s.i.g. The contacting temperature is about from 400° to 900° F., preferably 500° to 850° F. The operating temperature during the on-stream period preferably is maintained at as low a value as possible consistent with maintaining adequate per-pass conversions as catalyst fouling progresses. While those skilled in the art will realize that the desired initial and terminal temperatures will be influenced by various factors, including character of feed and catalyst, generally speaking it will be desirable to operate the process with an initial on-stream temperature of about from 500° to 750° F. with a progressive increase to about 800° to 850° F. to maintain substantially constant conversion of at least 25 volume percent, preferably 35 to 90 volume percent per pass, of the hydrocarbon feed to the products boiling below the initial boiling point of that feed.

Hydrocarcking catalyst

The catalyst employed in the hydrocracking zone in the process of the present invention may be any conventional hydrocracking catalyst. Examples of satisfactory catalysts include unsupported catalysts such as tungsten sulfide, and supported catalysts such as metals or sulfides or oxides of metals of Groups VI and VIII, deposited on a support such as silica-alumina, silica-magnesia, silica-zirconia, alumina-boria, alumina, etc. The catalyst composite may be fluorided. Examples of particularly preferred catalysts include nickel or cobalt sulfide on silica-alumina, nickel sulfide and tungsten sulfide or nickel sulfide and molybdenum sulfide on silica-magnesia. In general, catalysts having acidic properties, such as nickel sulfide on silica-alumina, are preferred when high yields of gasoline are desired and when large amounts of jet fuel are not required, and catalysts of less acidic properties, such as nickel sulfide and tungsten sulfide on silica-magnesia, are preferred when high yields of middle distillates are desired.

When catalysts with silica-alumina supports are used, the silica content of the support preferably is in the range of 30 to 99% by weight. When catalysts with a nickel oxide or nickel sulfide hydrogenating component are used, the nickel content is preferably from 0.1 to 15%, calculated as nickel, based on the weight of the total catalyst composite.

*Process Operation*

Referring now to the drawing, there shown is an exemplary process flow diagram suitable for carrying out the process of the present invention.

Referring now to FIG. 1, a suitable hydrocarbon feed, as defined above, is passed through line 1 into hydrocracking zone 2, where it is contacted with hydrogen supplied through line 3 and a suitable hydrocracking catalyst, as defined above, under suitable hydrocracking conditions, as defined above. From hydrocracking zone 2 an effluent is passed through line 4 into separation zone 5, where it is separated into various fractions, for example a gas fraction which may be withdrawn through line 6, a gasoline fraction which may be withdrawn through line 7, a middle distillate fraction which may be withdrawn through line 8, a 650° to 900° F. fraction which may be passed through line 9 to hydrocracking zone 2, and a fraction boiling above about 900° F. which may be withdrawn through line 10 for purposes of recycling at least a portion thereof to hydrocracking zone 2 through line 11 via hydrogenation zone 12. If desired, a portion of the materials in line 10 may be withdrawn from the system through line 10A.

As discussed above, it is of the essence of the present invention that at least 5 volume percent, and preferably from 50 to 100%, of all materials boiling above about 900° F. that are recycled from separation zone 5 to hydrocracking zone 2 are hydrogenated before being recycled. Accordingly, materials boiling above about 900° F. are recycled through line 11 into hydrogenation zone 12 where at least 5%, and preferably 50 to 100%, of said materials are hydrogenated in the presence of hydrogen passed through line 13 and in the presence of a suitable hydrogenation catalyst, as hereinafter defined, under suitable hydrogenation conditions, as hereinafter defined. Thereafter the effluent from hydrogenation zone 12 is passed through line 14 to hydrocarcking zone 2.

The objective of the hydrogenation in zone 12 is to hydrogenate a substantial quantity of high molecular weight polynuclear structures to reduce them at least down substantially to structures having not more than one aromatic ring in the condensed ring structure.

Those skilled in the art will appreciate that separation difficulties in individual cases may make it impossible, as a practical matter, to make a separation in separation zone 5 such that a bottoms fraction may be withdrawn through line 10 that contains only materials boiling above about 900° F. In such case, the advantages of the present invention may still be obtained by including in the materials passed from separation zone 5 to hydrogenation zone 12 materials boiling below about 900° F., to the extent made necessary by the separation difficulties in separation zone 5. For example, it may be desirable to pass from separation zone 5 to hydrogenation zone 12 all materials boiling above, for example, 650° F. The only limitation on the amount or boiling range of materials passed from separation zone 5 to hydrogenation zone 12 is that such materials must include materials boiling above about 900° F. The only limitation on the amount of hydrogenation of said materials in hydrogenation zone 12 is that they must be hydrogenated to the extent necessary to hydrogenate at least 5 volume percent, and preferably 50 to 100 volume percent, of the materials contained therein that boil above about 900° F.

Hydrogenation zone 12 may be a conventional hydrogenation vessel operated under conventional hydrogenation conditions with such conventional hydrogenation catalysts as supported platinum, palladium, nickel, rhodium, rhenium, nickel-molybdenum, etc., on a substantially neutral support, with platinum and nickel being preferred. Particularly effective results will be obtained when using a platinum catalyst comprising 0.5 weight percent platinum, supported on alumina, at temperatures of 300° to 650° F., liquid hourly space velocities of 0.1 to 10.0, and hydrogen feed rate of from 1500 to 4000 s.c.f. of hydrogen per barrel of stock contacted in zone 12. It is highly preferred in practicing the process of the present invention to conduct the reaction in hydrogenation zone 12 at a temperature substantially lower, preferably at least 100° F. lower, than the reaction temperature in hydrocracking zone 2.

While hydrogenation zone 12 may advantageously be a high pressure vessel located in the high pressure hydrogen system supplying hydrocracking zone 2, in which case it will operate at a pressure of at least 500 p.s.i.g. and preferably from 800 to 3000 p.s.i.g. In such case hydrogenation zone 12 may be a small, compact, simple, high pressure reactor, thereby dispensing with the need for larger and more expensive equipment that would be necessary if hydrogenation were accomplished in separate conventional hydrogenation facilities; and the hydrogen gas rate through hydrogenation zone 12 may be large enough to maintain adequate hydrogen partial pressure without the need of additional compression because the hydrogen rates to the hydrocracking zone may be relatively large compared to that necessary for hydrogenating the recycled bottoms fraction or fractions, hydrogenation zone 12 may be operated at low temperatures so that the heat required may be provided by the hot distillate stream from separation zone 5, hydrogenation zone 12 may be used to purify an impure hydrogen stream to the hydrocracking zone by absorption of the impurities, such as methane, in the recycle liquid stream at high pressure. It should also be noted that in some cases it might be advantageous to remove impurities such as $H_2S$ from the hydrogen supplied to zone 12 through 13 to avoid poisoning of the hydrogenation catalyst.

*Types of operation to which process is adapted*

While the invention will be described more particularly in connection with the method of fixed hydrocracking catalyst bed operation wherein the hydrocracking catalyst bed may be periodically regenerated in situ, the process is also well adapted to be carried out in a moving catalyst bed, or in a slurry-type operation, or in one of the fluidized catalyst type. However, since in carrying out the process of this invention the catalyst retains its activity over long periods of time, it is normally preferable, from an economic standpoint, to employ the fixed catalyst bed method of operation or some modification thereof.

The feed may be introduced into the hydrocracking zone as a liquid, vapor, or mixed liquid-vapor phase, depending upon the temperature, pressure, proportions of hydrogen and boiling range of the charge stocks utilized.

Examples

Figure 2:
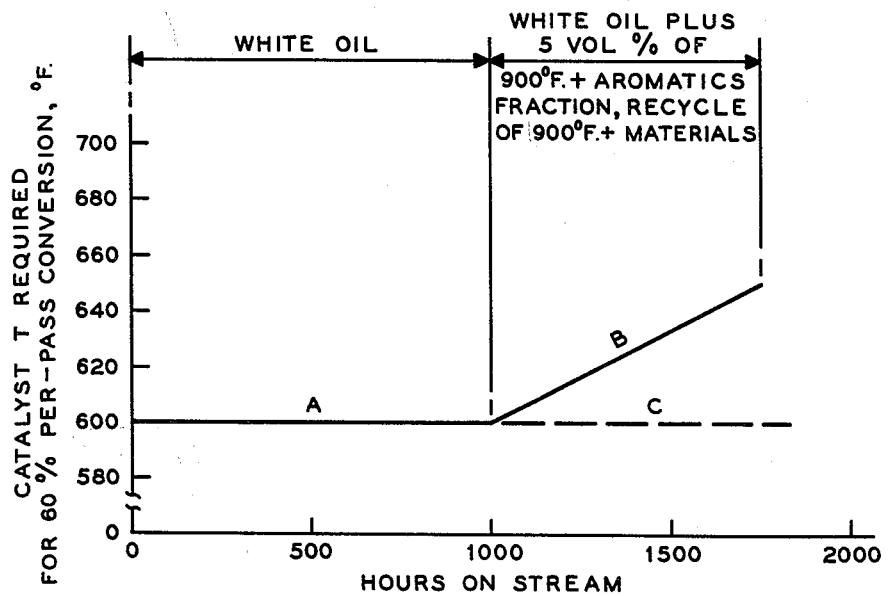
FIGS. 2, 3 and 4 are graphical illustrations of the difference in required hydrocracking catalyst temperatures necessary to maintain a given per-pass conversion when operating without employing the process of the present invention and the corresponding temperatures when the process of the present invention is employed.
Figure 3:
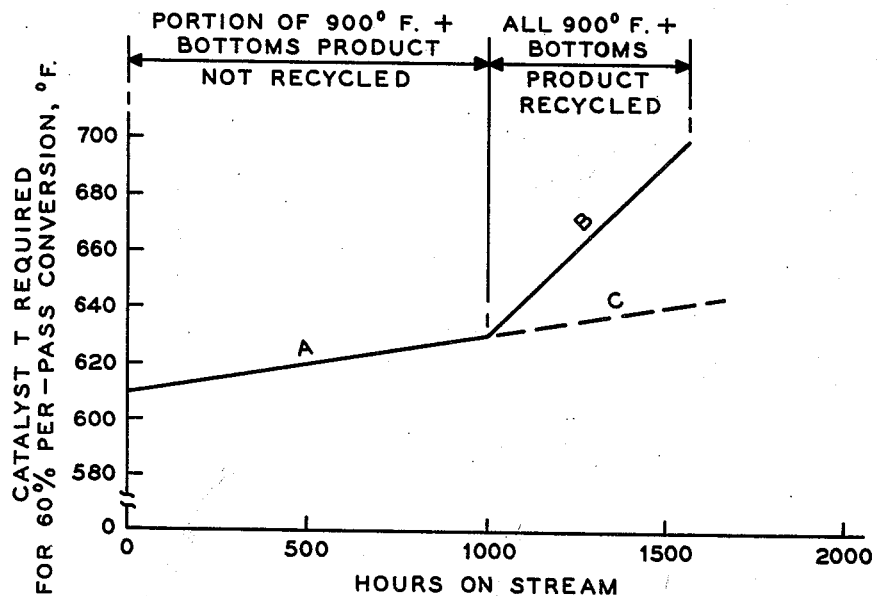
Figure 4:
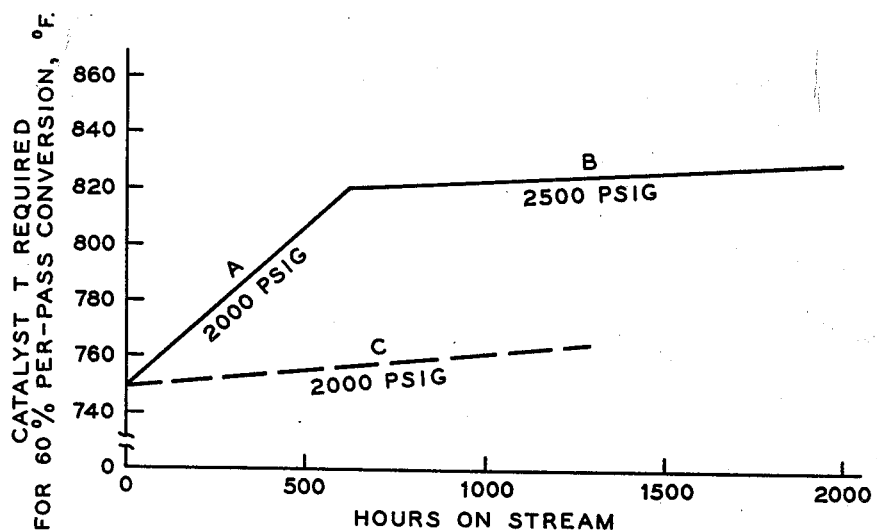

Examples of the advantageous results obtainable by practice of the present invention are illustrated in FIGS. 2, 3 and 4.

Referring now to FIG. 2, there shown is a graphical representation of the hydrocracking operating temperature required to maintain a constant per-pass conversion of approximately 60% when operating without employing the process of the present invention, compared with the corresponding temperatures required when employing the process of the present invention. It will be seen that essentially no change in the required operating temperature takes place for 1000 hours on stream when the feed is a white oil, as shown by line A, but that when 5 volume percent of aromatics boiling above about 900° F. is added to the white oil and all materials boiling above about 900° F. are recycled to the hydrocracking zone, a steady increase in operating temperature is required thereafter in order to maintain the same constant per-pass conversion, as shown by solid line B. However, when operating in accordance with the preferred embodiment of the process of the present invention, namely by hydrogenating from 50 to 100 volume percent of all recycle materials boiling above about 900° F., the rate of catalyst temperature increase necessary to maintain a constant per-pass conversion is substantially decreased, as shown by dashed line C in the figure.

Referring now to FIG. 3, there shown is a graphical representation, while hydrocracking a heavy Arabian gas oil, of the change in catalyst temperature required to maintain constant per-pass conversion when operating without employing the process of the present invention, compared with the corresponding change required when the process of the present invention is employed. Solid line A indicates the catalyst temperature increase required to maintain a constant per-pass conversion of 60% for the first 1000 hours on stream when a portion of the hydrocracking zone effluent boiling above about 900° F. is withdrawn from the system instead of being recycled to the hydrocracking zone. Such withdrawal is an expedient that can alleviate the tendency of heavy refractory polynuclear materials boiling above about 900° F. from building up in the system and from fouling the hydrocracking catalyst at an intolerable rate. Line B indicates the substantially greater rate of catalyst temperature increase required to maintain the same constant per-pass conversion when all of the hydrocracking zone effluent boiling above about 900° F. is recycled to the hydrocracking zone, without employing the process of the invention. Dashed line C, an illustration of operation in accordance with the process of the present invention, illustrates the substantial decrease in the rate of temperature increase necessary to maintain a constant per-pass conversion that is obtainable by hydrogenating the recycled materials boiling about about 900° F.

Referring now to FIG. 4, there shown is a graphical representation, while hydrocracking a heavy Arabian gas oil, of the change in catalyst temperature required to maintain a constant per-pass conversion when operating without employing the process of the present invention, compared with the corresponding change required when the process of the present invention is employed, and particularly illustrates the advantage obtainable by use of the process of the present invention in permitting operation of the hydrocracking zone at a lower pressure. Line A indicates the change in catalyst temperature required, when hydrocracking a heavy Arabian gas oil, to maintain a constant 60% per-pass conversion at a hydrocracking zone pressure of 2000 p.s.i.g. when all materials boiling above about 900° F. are recycled to the hydrocracking zone without employing the process of the present invention. Line B indicates the change in catalyst temperature required, when hydrocracking a heavy Arabian gas oil, to maintain a constant 60% per-pass conversion at a hydrocracking pressure of 2500 p.s.i.g. when all materials boiling above about 900° F. are recycled to the hydrocracking zone, without employing the process of the present invention. Dashed line C indicates the substantially lower operating temperatures and pressures that may be used to maintain the same substantially constant per-pass conversion, when employing the process of the present invention, namely by hydrogenating the materials boiling above about 900° F. that are recycled to the hydrocracking zone.

I claim:

1. In a hydrocracking process wherein fuels, including naphthas and middle distillates, are produced by contacting a fresh hydrocarbon feed selected from the group consisting of hydrocarbon distillates and hydrocarbon residua boiling above about 350° F. containing materials boiling above about 900° F. in a hydrocracking zone without prior multiple step hydrogenation, in the presence of at least 1000 s.c.f. of hydrogen per barrel of said feed, with a catalyst comprising a hydrogenating-dehydrogenating component disposed on a support at temperature of about from 400° to 900° F., a pressure of at least 500 p.s.i.g. and an LHSV of about from 0.1 to 15, and by withdrawing from said zone at least one normally gaseous fraction, at least one liquid product fraction, and at least one recycle fraction containing materials boiling above about 900° F., the improvement which comprises, prior to return of said recycle fraction to said hydrocracking zone, hydrogenating the polynuclear aromatics therein at least down substantially to structures containing not more than one aromatic ring in the condensed ring structure, to an extent that the compounds remaining therein that have at least two fused aromatic rings are reduced at least down to 5 volumes percent of said materials boiling above about 900° F.

2. In a hydrocracking process which comprises contacting a fresh hydrocarbon feed selected from the group consisting of hydrocarbon distillates and hydrocarbon residua boiling above about 350° F. and containing materials boiling above about 900° F. in a hydrocracking zone without prior multiple step hydrogenation, in the presence of at least 1000 s.c.f. of hydrogen per barrel of said feed, with a catalyst comprising a hydrogenating-dehydrogenating component disposed on a support at a temperature of about from 400° to 900° F., a pressure of at least 500 p.s.i.g., and an LHSV of about from 0.1 to 15, and withdrawing from said zone at least one normally gaseous fraction, at least one liquid product fraction, and at least one fraction boiling above the initial boiling point of said feed and containing materials above about 900° F., the method of achieving substantially complete conversion of said feed to said desired fuel products and achieving long runs exceeding 500 hours of continuous catalyst operation, which comprises hydrogenating, at a temperature at least 100° F. below the highest temperature in said hydrocracking zone, a sufficient volume percent of said recycle fraction to accomplish hydrogenation of at least 5 volume percent of all materials boiling above about 900° F. that are recycled to said hydrocracking zone.

References Cited by the Examiner

UNITED STATES PATENTS

| | | | |
|---|---|---|---|
| 2,459,465 | 1/49 | Smith | 208—57 |
| 2,944,006 | 7/60 | Scott | 208—109 |
| 3,092,567 | 6/63 | Koslowski et al. | 208—51 |

ALPHONSO D. SULLIVAN, *Primary Examiner.*